(12) United States Patent
Bauer et al.

(10) Patent No.: US 11,496,548 B2
(45) Date of Patent: Nov. 8, 2022

(54) DECENTRALIZED MANAGEMENT OF COLLABORATIVE OPERATIONS FOR DISTRIBUTED SYSTEMS

(71) Applicant: SAP SE, Walldorf (DE)

(72) Inventors: Andreas Bauer, Berlin (DE); Maik Görgens, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/549,997

(22) Filed: Aug. 23, 2019

(65) Prior Publication Data
US 2021/0058449 A1 Feb. 25, 2021

(51) Int. Cl.
G06F 15/16 (2006.01)
H04L 67/10 (2022.01)

(52) U.S. Cl.
CPC .................................. H04L 67/10 (2013.01)

(58) Field of Classification Search
CPC ....................................................... H04L 67/10
See application file for complete search history.

(56) References Cited

U.S. PATENT DOCUMENTS

| | | | |
|---|---|---|---|
| 6,052,695 A | 4/2000 | Abe et al. | |
| 6,941,360 B1 | 9/2005 | Srivastava et al. | |
| 7,516,132 B1 | 4/2009 | Fast et al. | |
| 9,830,346 B2 | 11/2017 | Beigel et al. | |
| 2007/0239695 A1 | 10/2007 | Chakra et al. | |
| 2008/0168139 A1* | 7/2008 | Junuzovic | H04L 67/1095 709/205 |
| 2009/0089341 A1 | 4/2009 | Skaria et al. | |
| 2009/0222824 A1 | 9/2009 | Little | |
| 2012/0089486 A1 | 4/2012 | Mahakian et al. | |

(Continued)

FOREIGN PATENT DOCUMENTS

JP 2004310455 A 11/2004

OTHER PUBLICATIONS

Configuring Global Coordination of Transactions (two-phase commit), IBM Integration Bus, Version 10.0.0.15 Operating Systems: AIX, HP-Itanium, Linux, Solaris, Windows, z/OS.

(Continued)

*Primary Examiner* — Suraj M Joshi
*Assistant Examiner* — Jaren Means
(74) *Attorney, Agent, or Firm* — Fountainhead Law Group P.C.

(57) ABSTRACT

Some embodiments provide a program executable by a first device in a distributed system. The program publishes a first request for a collaborative operation to a first log of the first device. The program further receives, at the first log, a second request for the same collaborative operation. The second request is requested by a second device in the distributed system. The program also publishes a command to a second log of the first device. The command specifies the collaborative operation, the first device and the second device as participants of the collaborative operation, a first set of operations to be performed by the first device as part of the collaborative operations, and a second set of operations to be performed by the second device as part of the collaborative operation. The program further performs the first set of operations as part of the collaborative operation.

20 Claims, 13 Drawing Sheets

(56) References Cited

U.S. PATENT DOCUMENTS

| | | | | |
|---|---|---|---|---|
| 2013/0339298 | A1* | 12/2013 | Muller | G06F 16/176 |
| | | | | 707/640 |
| 2014/0047356 | A1* | 2/2014 | Ameller-Van-Baumberghen | |
| | | | | H04L 65/403 |
| | | | | 715/753 |
| 2014/0123265 | A1* | 5/2014 | Borzycki | G06F 21/41 |
| | | | | 726/8 |
| 2017/0359407 | A1* | 12/2017 | Rothrock | H04L 67/01 |
| 2019/0064913 | A1 | 2/2019 | O'Brien et al. | |

OTHER PUBLICATIONS

Akmal B. Chaudhri, Apache Ignite Transactions Architecture: Failover and Recovery, Feb. 6, 2018.

* cited by examiner

| Request Log | | |
|---|---|---|
| Request ID | Node | Operation |
| R1 | 105a | Load A.csv |
| R2 | 105b | Load A.csv |
| | | |
| | | |
| | | |
| | | |
| | | |

200

| Command Log | | |
|---|---|---|
| Operation ID | Nodes | Requests |
| | | |
| | | |
| | | |
| | | |
| | | |
| | | |
| | | |

| Request Log | | |
|---|---|---|
| Request ID | Node | Operation |
| R1 | 105a | Load A.csv |
| R2 | 105b | Load A.csv |
| R3 | 105c | Load A.csv |
| | | |
| | | |
| | | |
| | | |

200

| Command Log | | |
|---|---|---|
| Operation ID | Nodes | Requests |
| C1 | 105a, 105b | R1, R2 |
| | | |
| | | |
| | | |
| | | |
| | | |
| | | |

| Request Log 200 |||
|---|---|---|
| Request ID | Node | Operation |
| R1 | 105a | Load A.csv |
| R2 | 105b | Load A.csv |
| R3 | 105c | Load A.csv |

| Command Log 205 |||
|---|---|---|
| Operation ID | Nodes | Requests |
| C1 | 105a, 105b | R1, R2 |
| C2 | 105a, 105b, 105c | R1, R2, R3 |

FIG. 2C

| Request Log 200 |||
|---|---|---|
| Request ID | Node | Operation |
| R1 | 105a | Load A.csv |
| R2 | 105b | Load A.csv |
| R3 | 105c | Load A.csv |

| Command Log 205 |||
|---|---|---|
| Operation ID | Nodes | Requests |
| C1 | 105a, 105b | R1, R2 |
| C2 | 105a, 105b, 105c | R1, R2, R3 |
| C3 | 105c | R3 |

FIG. 2D

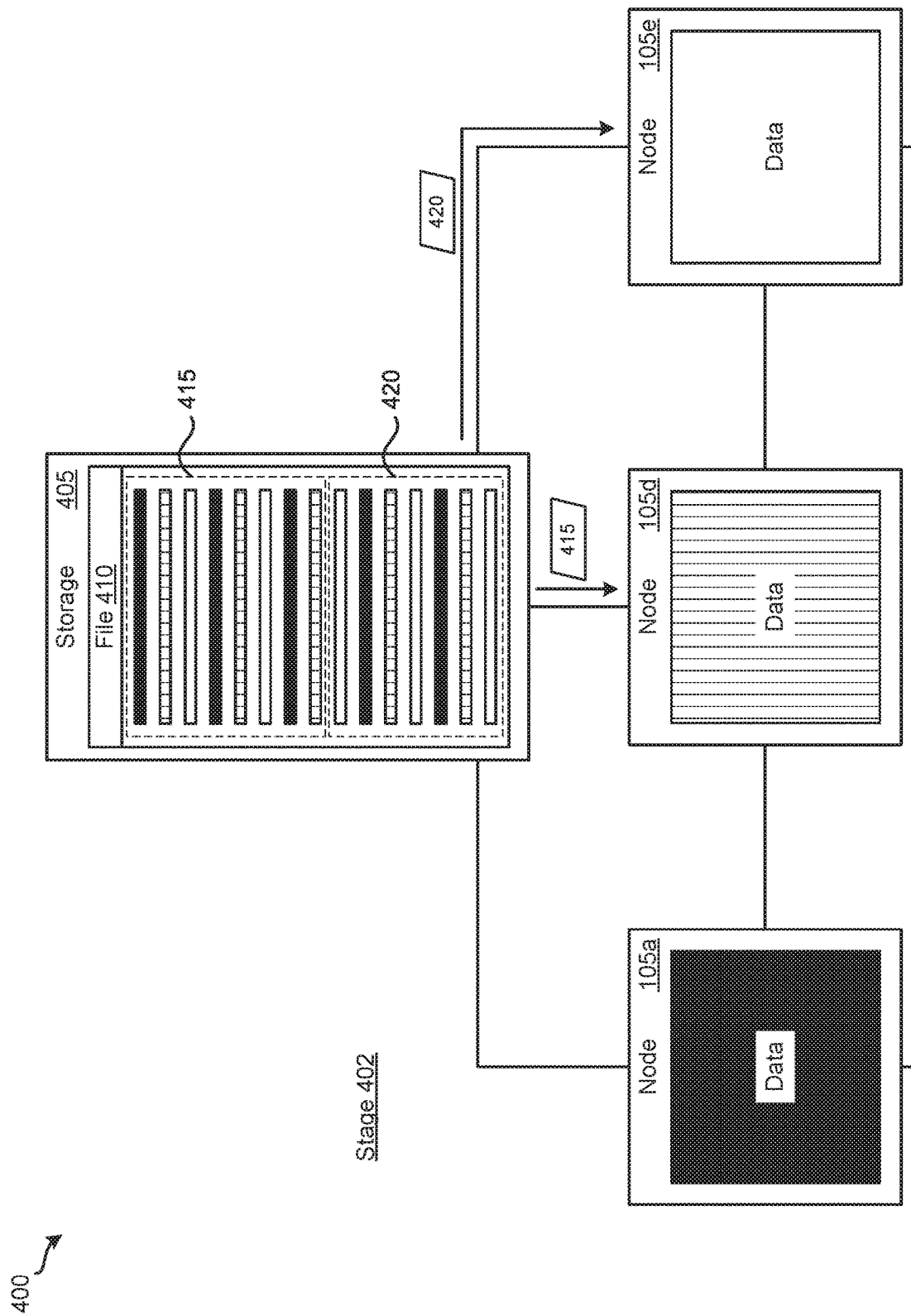

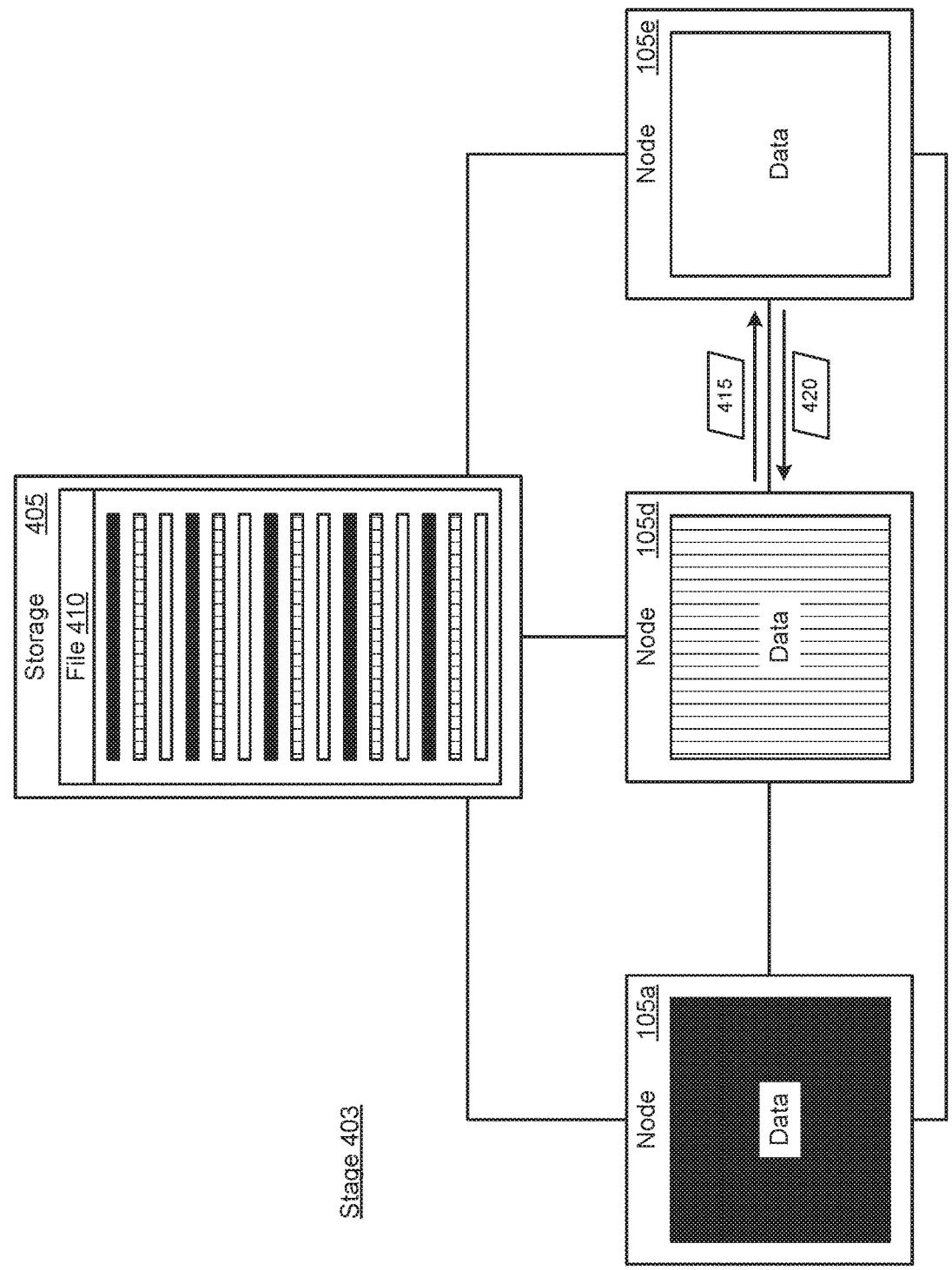

DECENTRALIZED MANAGEMENT OF COLLABORATIVE OPERATIONS FOR DISTRIBUTED SYSTEMS

BACKGROUND

In some distributed system, collaborative operations may be performed by several nodes in the distributed system. In a collaborative operation, multiple nodes can work together to achieve a common task more efficiently than working on the task individually. The set of nodes participating in the collaborative operation is not defined by the operation a priori. Requests for collaborative operations can arise asynchronously at individual nodes. All nodes that want to execute such an operation at about the same point in time may be part of a collaborative operation. Whether a node is part of a collaborative operation or not may depend on the timing of the requests. Therefore, collaborative operations typically need some form of orchestration. A simple form of orchestration can be provided by a central orchestration unit. This unit can receive requests from nodes and decide which nodes collaborate in an operation together.

SUMMARY

In some embodiments, a non-transitory machine-readable medium stores a program executable by at least one processing unit of a first device in a distributed system. The program publishes a first request for a collaborative operation to a first log of the first device. The program further receives, at the first log, a second request for the same collaborative operation. The second request is requested by a second device in the distributed system. The program also publishes a command to a second log of the first device. The command specifies the collaborative operation, the first device and the second device as participants of the collaborative operation, a first set of operations to be performed by the first device as part of the collaborative operations, and a second set of operations to be performed by the second device as part of the collaborative operation. The program further performs the first set of operations as part of the collaborative operation.

In some embodiments, the program may further receive, at the first log, a third request for the same collaborative operation. The third request may be requested by a third device in the distributed system. The command may further specify the third device as a participant of the collaborative operation and a third set of operations to be performed by the third device as part of the collaborative operations.

The collaborative operation may be a collaborative file loading operation. The first set of operations includes reading a first portion of a file from a shared storage. The second set of operations may include reading a second remaining portion of the file from the shared storage. The first set of operations may further include transmitting the first portion of the file to the second device in the distributed system. In some embodiments, the collaborative operation may be a collaborative data recovery operation. The first log and the second log may be implemented as a single log.

In some embodiments, a method, executable by a first device in a distributed system, publishes a first request for a collaborative operation to a first log of the first device. The method further receives, at the first log, a second request for the same collaborative operation. The second request is requested by a second device in the distributed system. The method also publishes a command to a second log of the first device. The command specifies the collaborative operation, the first device and the second device as participants of the collaborative operation, a first set of operations to be performed by the first device as part of the collaborative operations, and a second set of operations to be performed by the second device as part of the collaborative operation. The method further performs the first set of operations as part of the collaborative operation.

In some embodiments, the method may further receive, at the first log, a third request for the same collaborative operation. The third request may be requested by a third device in the distributed system. The command may further specify the third device as a participant of the collaborative operation and a third set of operations to be performed by the third device as part of the collaborative operations.

In some embodiments, the collaborative operation may be a collaborative file loading operation. The first set of operations may include reading a first portion of a file from a shared storage. The second set of operations may include reading a second remaining portion of the file from the shared storage. The first set of operations may further include transmitting the first portion of the file to the second device in the distributed system. The collaborative operation may be a collaborative data recovery operation. The first log and the second log may be implemented as a single log.

For a first system in a distributed system, the first system includes a set of processing units and a non-transitory machine-readable medium that stores instructions. The instructions cause at least one processing unit to publish a first request for a collaborative operation to a first log of the first system. The instructions further cause the at least one processing unit to receive, at the first log, a second request for the same collaborative operation. The second request is requested by a second system in the distributed system. The instructions also cause the at least one processing unit to publish a command to a second log of the first system. The command specifies the collaborative operation, the first system and the second system as participants of the collaborative operation, a first set of operations to be performed by the first system as part of the collaborative operations, and a second set of operations to be performed by the second system as part of the collaborative operation. The instructions further cause the at least one processing unit to perform the first set of operations as part of the collaborative operation.

In some embodiments, the instructions may further cause the at least one processing unit to receive, at the first log, a third request for the same collaborative operation. The third request may be requested by a third system in the distributed system. The command may further specify the third system as a participant of the collaborative operation and a third set of operations to be performed by the third system as part of the collaborative operations.

In some embodiments, the collaborative operation may be a collaborative file loading operation. The first set of operations may include reading a first portion of a file from a shared storage. The second set of operations may include reading a second remaining portion of the file from the shared storage. The first set of operations may further include transmitting the first portion of the file to the second system in the distributed system. The collaborative operation may be a collaborative data recovery operation.

The following detailed description and accompanying drawings provide a better understanding of the nature and advantages of the present invention.

BRIEF DESCRIPTION OF THE DRAWINGS

FIGS. 2A-2D illustrate an example request log and an example command log according to some embodiments.

FIGS. 4A-4C illustrate another example collaborative operation according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for decentralized management of collaborative operations for distributed systems. In some embodiments, a distribute system includes several nodes. Each node may include a request log and a command log. The request and command logs are synchronized with each other so that every node has the same data in the request and command logs. Some nodes in the distributed system may each publish to the request log a request to perform the same collaborative operation. One of the nodes may publish to the command log a command that specifies which nodes are to work together to perform the collaborative operation and the responsibilities of each node in performing the collaborative operation. The nodes participating in the collaborative operation perform their respective parts.

The techniques described in the present application provide a number of benefits and advantages over conventional methods for managing collaborative operations in distributed systems. For example, using request and command logs synchronized across each of the nodes in the distributed system allows the nodes to manage collaborative operations in a decentralized manner. This eliminates the need for a centralized unit used in conventional techniques for managing the collaborative operations for the nodes. As a result, the decentralized techniques described herein provide more reliability and scalability because approaches using a centralized unit provides a single point of failure very low scalability.

1. Example Architecture of Distributed System

Figure 1:
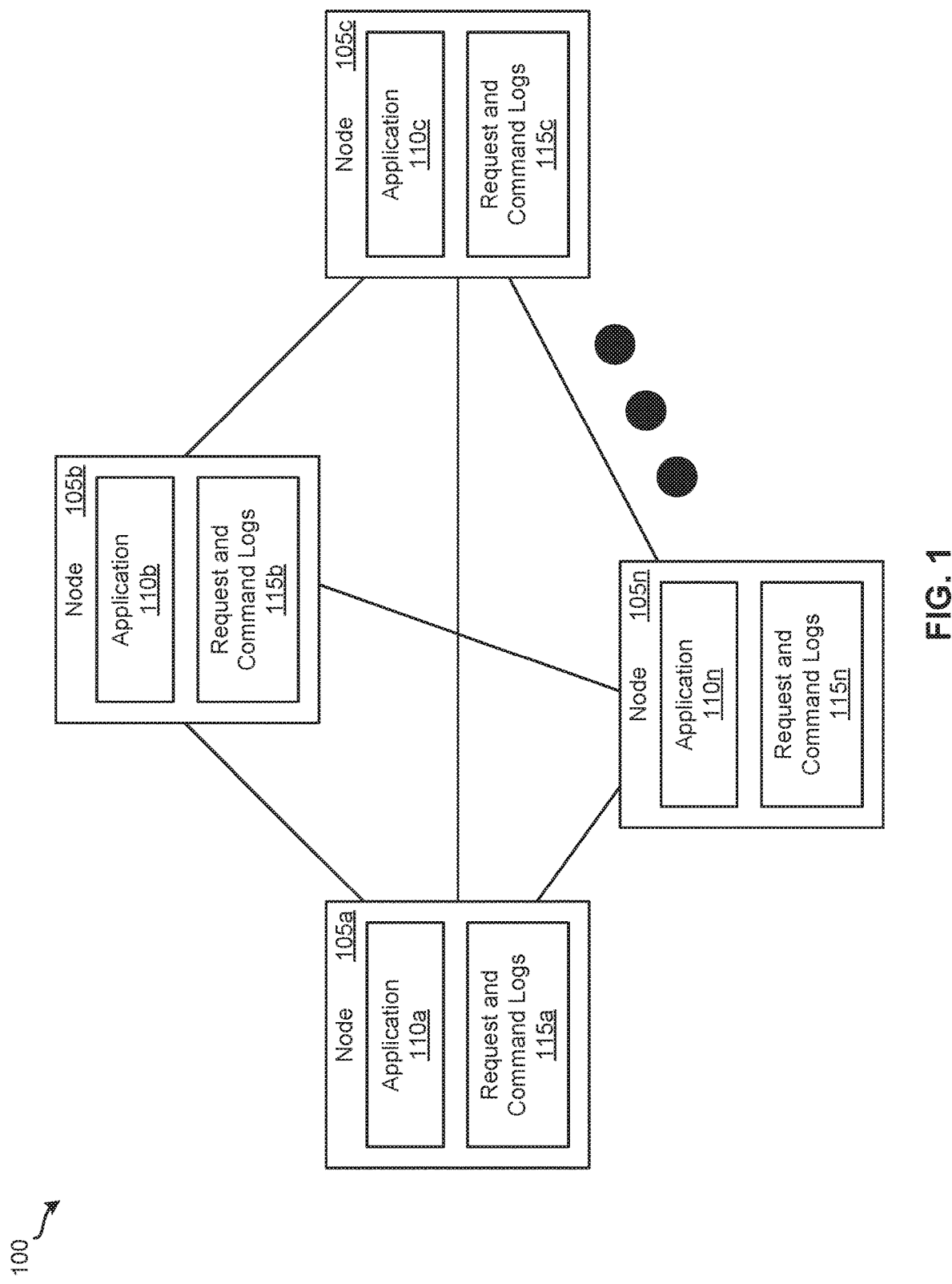
FIG. 1 illustrates a distributed system according to some embodiments.

FIG. 1 illustrates a distributed system 100 according to some embodiments. As shown, distributed system 100 includes nodes 105a-105n. Each node 105 may be communicatively coupled to every other node 105 in distributed system 100 via direct connection and/or one or more networks (not shown). In other words, nodes 105a-105n are communicatively coupled to each other in a full mesh manner.

As illustrated in FIG. 1, each of the nodes 105a-105n includes application 110 and request and command logs 115. Application 110 may be a software application operating on the respective node 105. Application 110 can be any number of different types of applications. For instance, application 110 may be a data management application, a data processing application, a data orchestration application, etc. Request and command logs 115 includes a request log and a command log. The request log is a sequential and ordered log configured to store requests for collaborative operations by a node 105. The command log is a sequential and ordered log configured to store collaborative operations to be executed by one or more nodes 105. A sequential and ordered log may be a log that stores entries/records in the order in which they are written to the log. In some embodiments, the request log and the command log are implemented as separate data structures (e.g., tables). In other embodiments, the request log and the command log are implemented as a single data structure (e.g., a table). Request and command logs 115 are synchronized across nodes 105a-105n. In some embodiments, nodes 105a-105n use a Raft protocol to synchronize request and command logs 115. Other techniques for synchronizing request and command logs 115 may be used. For example, a Paxos protocol can be used in some embodiments.

2. Example Operation of Distributed System

An example operation of distributed system 100 will now be described by reference to FIGS. 2A-2D. FIGS. 2A-2D illustrate an example request log 200 and an example command log 205 according to some embodiments. For this example, request log 200 and command log 205 conceptually illustrates the data synchronized across the request logs and commands logs stored in each of the nodes 105a-105n. The example operation starts by node 105a publishing to the request log of its request and command logs 115a a request R1 for a collaborative operation to load a file (A.csv in this example) from a shared storage (not shown) into node 105a. Next, node 105b publishes to the request log of its request and command logs 115b a request R2 for a collaborative operation to load the same file (A.csv in this example) from the shared storage into node 105b.

FIG. 2A illustrates request log 200 and command log 205 after the requests R1 and R2 published by node 105a and node 105b, respectively, are synchronized across, and shown up in, all the request and command logs 115a-n of nodes 105a-105n. As shown, request log 200 includes a first entry specifying request R1, node 105a as the requesting node, and load A.csv as the collaborative operation. Similarly, a second entry specifies request R2, node 105b as the requesting node, and load A.csv as the collaborative operation.

In some embodiments, at a defined amount of time (e.g., ten seconds, one minute, three minutes, five minutes, ten minutes, etc.) after a node 105 publishes a request to the request log of its request and command log 115, the node 105 checks the request log for any other requests for the same collaborative operation that have not been published to the command log and publishes a command to the command log of its request and command log 115 that specifies a collaborative operation to be executed by nodes requesting the same collaborative operation. In some embodiments, each of the nodes 105a-105n uses the same defined amount of time. In other embodiments, some nodes 105a-105n can use different defined amounts of time. For instance, node 105a can use one minute as its defined amount of time while node 105b can use five minutes as its defined amount of time. Continuing with the example, after the defined amount of time has elapsed, node 105a checks its request log for requests for the same collaborative operation that have not been published to the command log. In this example, node 105a checks the request log and sees requests R1 and R2 are for the same collaborative operation and have not been published to the command log. Thus, node 105a publishes a command for C1 to the command log of its request and command log 115a. The command for C1 specifies that node 105a is the leader of the collaborative operation, nodes 105a and 105h are participating in the collaborative operation, node 105a is to read the first half of file A.csv from the shared storage, and node 105b is to read the second half of file A.csv from the shared storage. In some embodiments, a leader of a collaboration operation is responsible for managing the collaboration operation. For example, in some such embodiments, a leader of a collaboration operation may collect from and communicate to participants in the collaboration operation encountered errors during the collaboration operation, completion of the collaboration operation, etc.

FIG. 2B illustrates request log 200 and command log 205 after the command for C1 published by node 105a is synchronized across, and shown up in, all the request and command logs 115a-n of nodes 105a-105n. As shown, command log 205 includes a first entry specifying C1 as a unique identifier for the collaborative operation, nodes 105a and 105b as participants of the collaborative operation, and requests R1 and R2 being fulfilled by the command Information that node 105a is to read the first half of file A.csv from the shared storage and node 105b is to read the second half of file A.csv from the shared storage is stored in command log 205 but not shown in FIG. 2B. In this example, shortly before node 105a published the command for C1, node 105c publishes to the request log of its request and command logs 115c a request R3 for a collaborative operation to load the same file (A.csv in this example) from the shared storage into node 105c. As illustrated in FIG. 2B, request log 200 includes a third entry specifying request R3, node 105c as the requesting node, and load A.csv as the collaborative operation.

After node 105a publishes the command for C1, node 105a periodically scans the command log of its request and command log 115a for the command for C1 to show up. That is because when node writes a command its command log, it is not immediately readable. It takes some time for the command to be synchronized across all the nodes 105a-105n and show up in the request and command logs 115a-115n of nodes 105a-105n. Once node 105a finds the command for C1 in its command log, node 105a checks whether there are any conflicts with the command for C1. Since, in this example, the command for C1 is the first command in the command log, there are no conflicts. As such, node 105a executes its part of the collaborative operation. For this example, node 105a reads the first half of file A.csv from the shared stored and sends a copy of it to node 105b.

For this example, the defined amount of time for node 105b elapsed after node 105c published request R3 but before the command for C1 showed up in the request and command log 115b of node 105b. Therefore, when node 105b checks its request log for any other requests for the same collaborative operation and finds requests R1 and R3. Node 105b then publishes a command for C2 to the command log of its request and command log 115b. The command for C2 specifies that node 105b is the leader of the collaborative operation, nodes 105a, 105b, and 105c are participating in the collaborative operation, node 105a is to read the 1st third of file A.csv from the shared storage, node 105b is to read the 2nd third of file A.csv from the shared storage, and node 105c is to read the 3rd third of file A.csv from the shared storage.

FIG. 2C illustrates request log 200 and command log 205 after the command for C2 published by node 105b is synchronized across, and shown up in, all the request and command logs 115a-n of nodes 105a-105n. As illustrated, command log 205 includes a second entry specifying the command for C2, nodes 105a, 105b, and 105c as participants of the collaborative operation, and requests R1, R2, R3 being fulfilled by the command. Information that node 105a is to read the 1st third of file A.csv from the shared storage, node 105b is to read the 2nd third of file A.csv from the shared storage, and node 105c is to read the 3rd third of file A.csv from the shared storage is stored in command log 205 but not shown in FIG. 2C.

Upon publishing the command for C2, node 105b periodically scans the command log of its request and command log 115b for the command for C2 to show up. Once node 105b finds the command for C2 in its command log, node 105b checks whether there are any conflicts with the command for C2. As used for this example, two commands conflict if at least one request is specified as being fulfilled by both commands. In addition, the command published earlier is determined to be the valid command of the two conflicting commands and the command published later is determined to be the invalid command of the two conflicting commands. As shown in FIG. 2C, requests R1 and R2 are both specified as being fulfilled by commands C1 and C2. As such, commands C1 and C2 conflict. Since the command for C1 was published before the command for C2, node 105b determines that the command for C1 is valid and that the command for C2 is invalid. Accordingly, node 105b executes its part of the collaborative operation specified by the command for C1. For this example, node 105b reads the second half of file A.csv from the shared stored and sends a copy of it to node 105a.

Once the defined amount of time after node 105c published request R3 has elapsed, node 105c checks its request log for requests for the same collaborative operation that have not been published to the command log. For this example, node 105c checks the request log and finds requests R1, R2, and R3 are for the same collaborative operation. However, when node 105c checks the command log, it sees the two conflicting commands C1 and C2, determines the command for C1 is valid and the command for C2 is invalid (similar to how node 105b determined so), and determines that request R3 is the only request for the collaborative operation. Accordingly, node 105c publishes a command C3 to the command log of its request and command log 115c. The command C3 specifies that node 105c is the leader of the collaborative operation, node 105c is participating in the collaborative operation, and node 105c is to read the entire file A.csv from the shared storage.

FIG. 2D illustrates request log 200 and command log 205 after the command C3 published by node 105c is synchronized across, and shown up in, all the request and command logs 115a-n of nodes 105a-105n. As shown, command log 205 includes a third entry specifying command C3, node 105c as the participant of the collaborative operation, and request R3 being fulfilled by the command. Information that node 105c is to read the entire file A.csv from the shared storage is stored in command log 205 but not shown in FIG. 2D.

Once publishing the command for C2, node 105c periodically scans the command log of its request and command log 115c for the command C3 to show up. When node 105c finds command C3 in its command log, node 105b checks whether there are any conflicts with its command C3. Node 105c does not consider the command for C2 because it already determined that the command for C2 is invalid. So node 105c determines that there are no conflicts since request R3 is not found in any of the valid commands in the command log (the command for C1 in this example). As such, node 105c executes its part of the collaborative operation specified by command C3. In this example, node 105c reads the entire file A.csv from the shared stored.

The operation described above is just one of many examples of how decentralized management of collaborative operations for distributed systems may be utilized. One of ordinary skill in the art will appreciate that any number of different collaborative operations may be managed using such a technique. In addition, different embodiments may use different methods to determine whether commands conflict.

3. Example Collaborative Opera

The previous section described an example of managing collaborative operations. In this section, two example collaborative operations will be described. The first collaborative operation involves loading a file from a shared storage. The second collaborative operation involves backup nodes recovering data after some nodes fail.

Figure 3A:
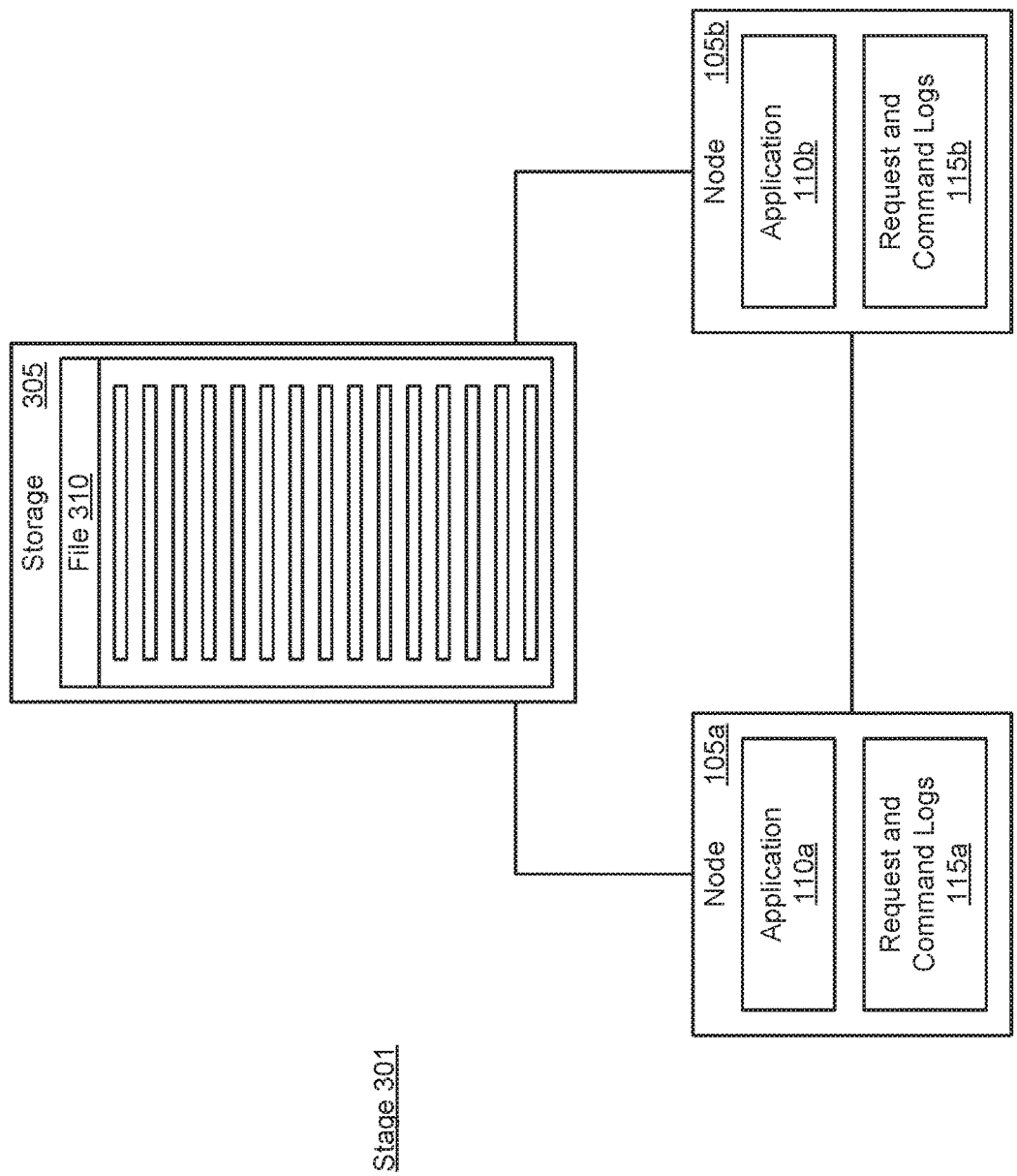
FIGS. 3A-3C illustrate an example collaborative operation according to some embodiments.
Figure 3B:
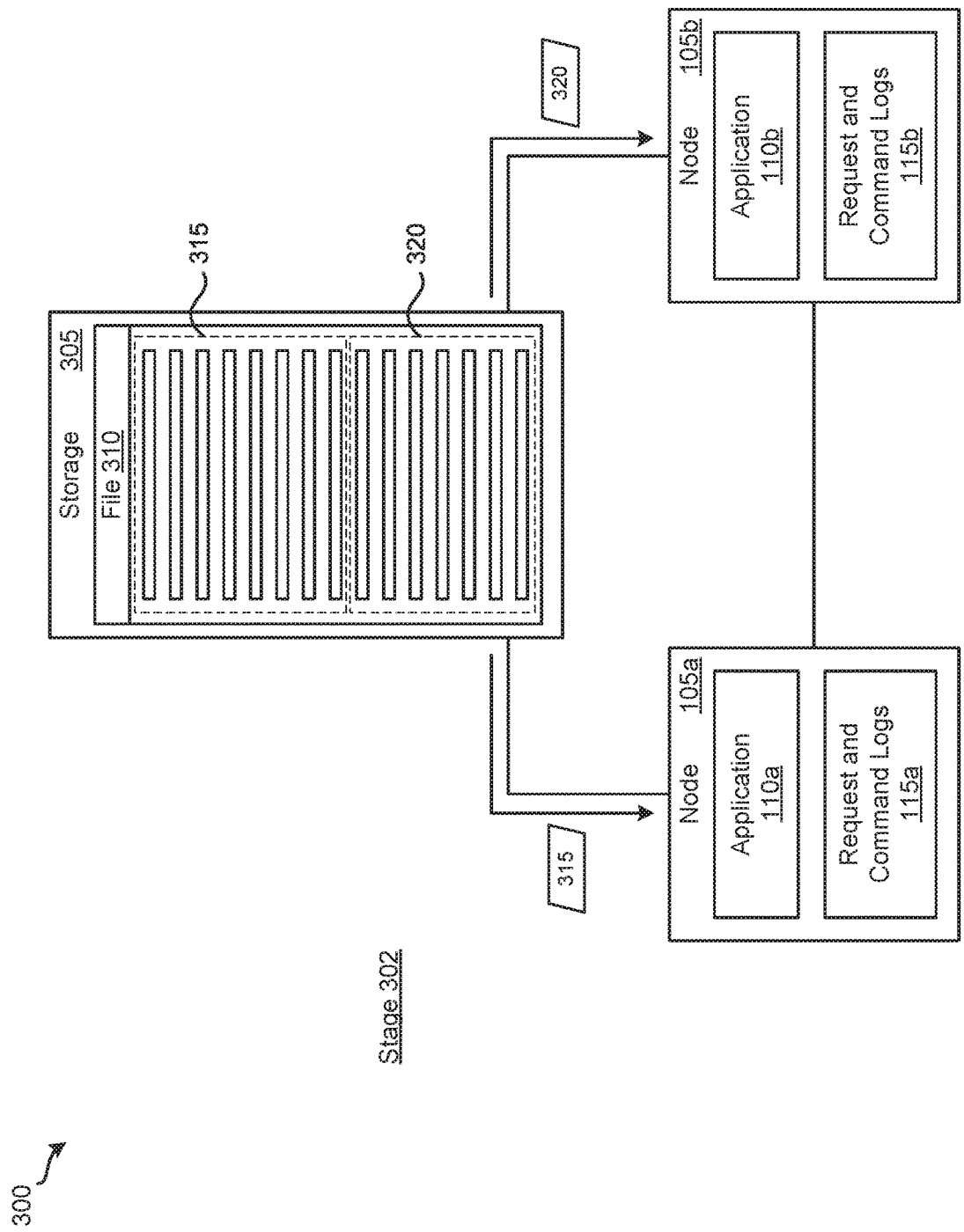
Figure 3C:
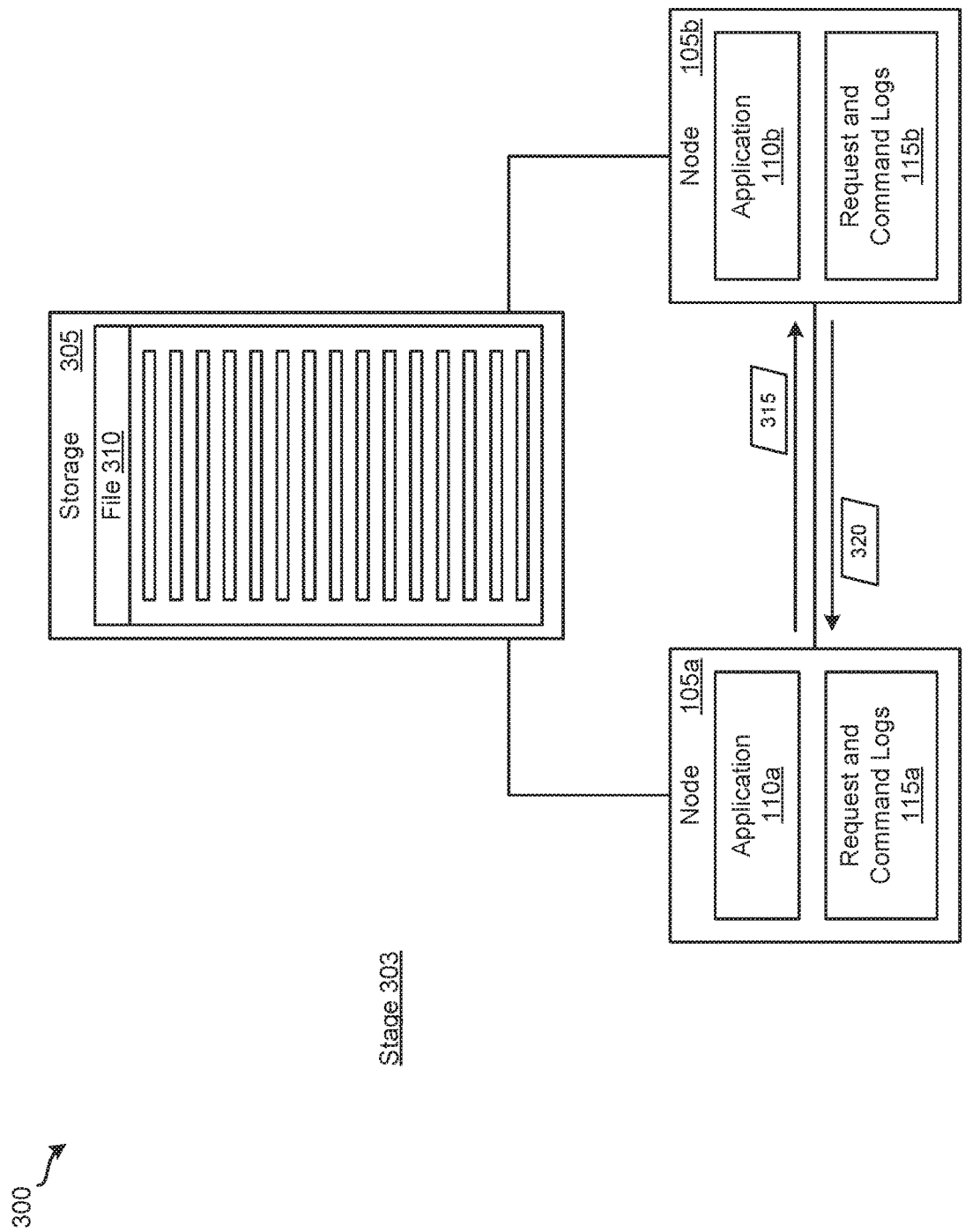

FIGS. 3A-3C illustrate an example collaborative operation according to some embodiments. Specifically, FIGS. 3A-3C illustrate system 300 at three stages 301-303 of a collaborative file loading operation. As shown in the first stage 301 in FIG. 3A, system 300 includes node 105a, node 105b, and shared storage 305. Shared storage 305 includes file 310. As shown, file 310 includes several sequential blocks of data, which are represented by horizontal rectangular blocks. In this example, the collaborative operation specifies that node 105a is to read the first half of file 310 and node 105b is to read the second half of file 310.

In the second stage 302 of system 300, FIG. 3B shows nodes 105a and 105b reading file 310 from shared storage 305. As illustrated, node 105a is reading the first half of horizontal rectangular blocks 315 of file 310. Once node 105a reads blocks 315 from shared storage 305, it stores blocks 315 in its storage (not shown). Additionally, FIG. 3B shows node 105b reading the second half of horizontal rectangular blocks 320 of file 310. After reading blocks 320 from shared storage 305, node 105b stores blocks 320 in its storage (not shown).

FIG. 3C illustrates the last stage 303 of the collaborative file loading operation. At stage 303, nodes 105a and 105b share their data with each other. As shown, node 105a is transmitting blocks 315 to node 105b. Similarly, node 105b is transmitting blocks 320 to node 105a. When node 105b receives blocks 315 from node 105a, node 105b stores blocks 315 in its storage. Likewise, node 105a stores blocks 320 in its storage when it receives blocks 320 from node 105b.

Figure 4A:
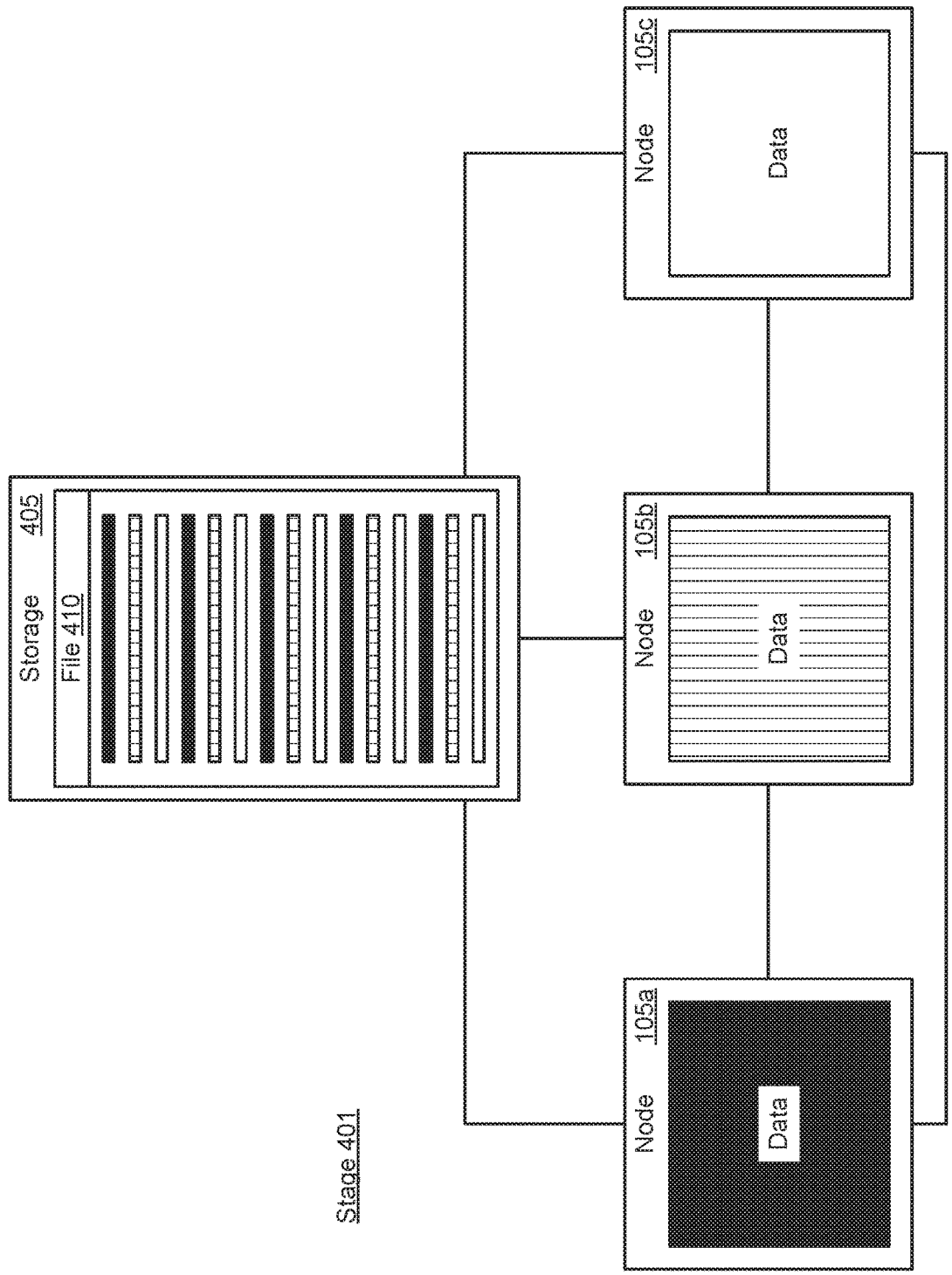

FIGS. 4A-4C illustrate another example collaborative operation according to some embodiments. FIGS. 4A-4C illustrate system 400 at three stages 401-403 of a collaborative data recovery operation. As shown in the first stage 401 in FIG. 4A, system 400 includes nodes 105a-node 105c and shared storage 405. Shared storage 405 includes file 410. As illustrated, file 410 includes several sequential blocks of data, which are represented by horizontal rectangular blocks. For this example, node 105a is configured to store the black rectangular blocks of data in file 410, as indicated by the black block of data in node 105a. Node 105b is configured to store the vertically-striped rectangular blocks of data in file 410, as indicated by the vertically-striped block of data in node 105b. Lastly, node 105c is configured to store the white rectangular blocks of data in file 410, as indicated by the white block of data in node 105c. In this example, nodes 105b and 105c fail around the same time. Backup node 105d replaces node 105b and backup node 105e replaces node 105c. During the initialization of backup nodes 105d and 530105e, a valid collaborative operation is published. The collaborative operation specifies that node 105d is to read the first half of file 410 and node 105e is to read the second half of file 410.

The second stage 402 of system 400 illustrates nodes 105d and 105e reading file 410 from shared storage 405. As shown in FIG. 4B, backup node 105d has replaced failed 105b and backup node 105e has replaced failed node 105c. Node 105d is reading the first half of horizontal rectangular blocks 415 of file 410. After node 105d reads blocks 415 from shared storage 405, node 105d stores the vertically-striped blocks in blocks 415 in its storage (not shown). FIG. 4B also illustrates node 105e reading the second half of horizontal rectangular blocks 420 of file 410. Upon reading blocks 420 from shared storage 405, node 105e stores the white block in blocks 420 in its storage (not shown).

FIG. 4C illustrates the third stage 403 of system 400. At stage 403, nodes 105d and 105e share their data with each other. As illustrated, node 105d is transmitting blocks 415 to node 105e. Also, node 105e is transmitting blocks 420 to node 105d. Once node 105d is done transmitting blocks 415 to node 105e, node 105d discards the blocks in blocks 415 (i.e., the black blocks and the white blocks) that it is not configured to store. When node 105e receives blocks 415 from node 105d, node 105e stores the white blocks in blocks 415 in its storage and discards the other blocks in blocks 415 (i.e., the black blocks and the vertically-striped blocks). After node 105e is done transmitting blocks 420 to node 105d, node 105e discards the blocks in blocks 420 (i.e., the black blocks and the vertically-striped blocks) that it is not configured to store. Once node 105d receives blocks 420 from node 105e, node 105d stores the vertically-striped blocks in blocks 420 in its storage and discards the other blocks in blocks 420 (i.e., the black blocks and the white blocks).

The examples above describe several example collaborative operations. One of ordinary skill in the art will understand that any number of collaborative operations are possible where two or more nodes work together to accomplish a common task more efficiently than working on the task individually. For example, a collaboration operations may be an expensive function evaluation that several nodes might need to compute around the same time. By using a collaborative operation, the function can be evaluated in shorter time and using less resources.

4. Example Process

Figure 5:
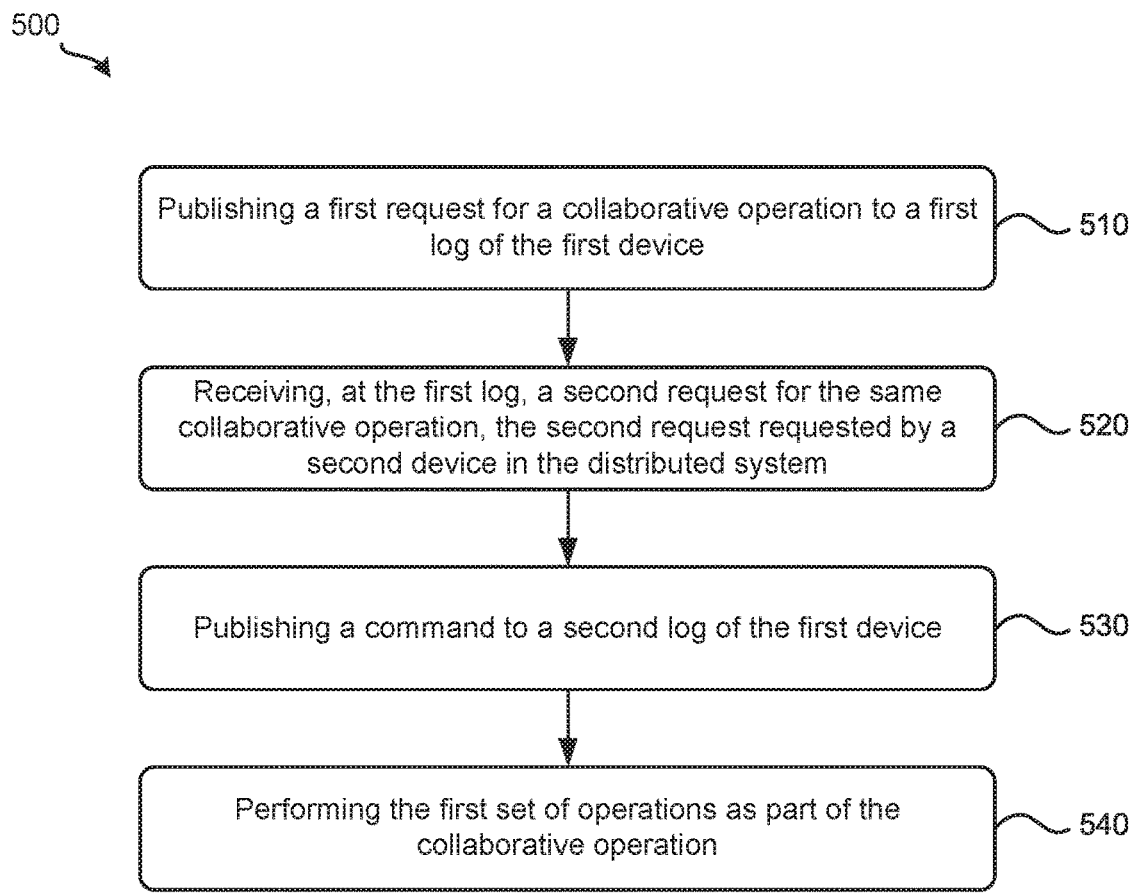
FIG. 5 illustrates a process for managing a collaborative operation according to some embodiments.

FIG. 5 illustrates a process 500 for managing a collaborative operation according to some embodiments. In some embodiments, a node 105 performs process 500. Process 500 begins by publishing, at 510, a first request for a collaborative operation to a first log of the first device. Referring to FIGS. 1 and 2A as an example, node 105a may publish request R1 for the collaborative operation of loading a file A.csv from a shared storage to the request log of node 105a.

Next, process 500 receives, at 520, at the first log, a second request for the same collaborative operation. The second request is requested by a second device in the distributed system. Referring to FIGS. 1 and 2A as an example, node 105b may publish request R2 for the same collaborative operation of loading the file A.csv from the shared storage to the request log of node 105b. Once request R2 is synchronized across all the nodes 105a-105n, node 105a receives request R2 at the request log of node 105a.

Process 500 then publishes, at 530, a command to a second log of the first device. The command specifies the collaborative operation, the first device and the second device as participants of the collaborative operation, a first set of operations to be performed by the first device as part of the collaborative operations, and a second set of operations to be performed by the second device as part of the collaborative operation. Referring to FIGS. 1 and 2B as an example, node 105a publishes a command to the command log of node 105a. The command specifies C1 as a unique identifier for the collaborative operation, nodes 105a and 105b as participants of the collaborative operation, and requests R1 and R2 being fulfilled by the command.

Finally, process 500 performs, at 540, the first set of operations as part of the collaborative operation. Referring to FIGS. 1 and 3B as an example, the collaborative operation may be a collaborative file loading operation where node 105a is responsible for reading blocks 315 of file 310 from shared storage 305 (the first set of operations in this example) and node 105b is responsible for reading blocks 320 of file 310 from shared storage 305 (the second set of operations in this example). Thus, node 105a performs the reading of blocks 315 of file 310 from shared storage 305.

5. Example Systems and Devices

Figure 6:
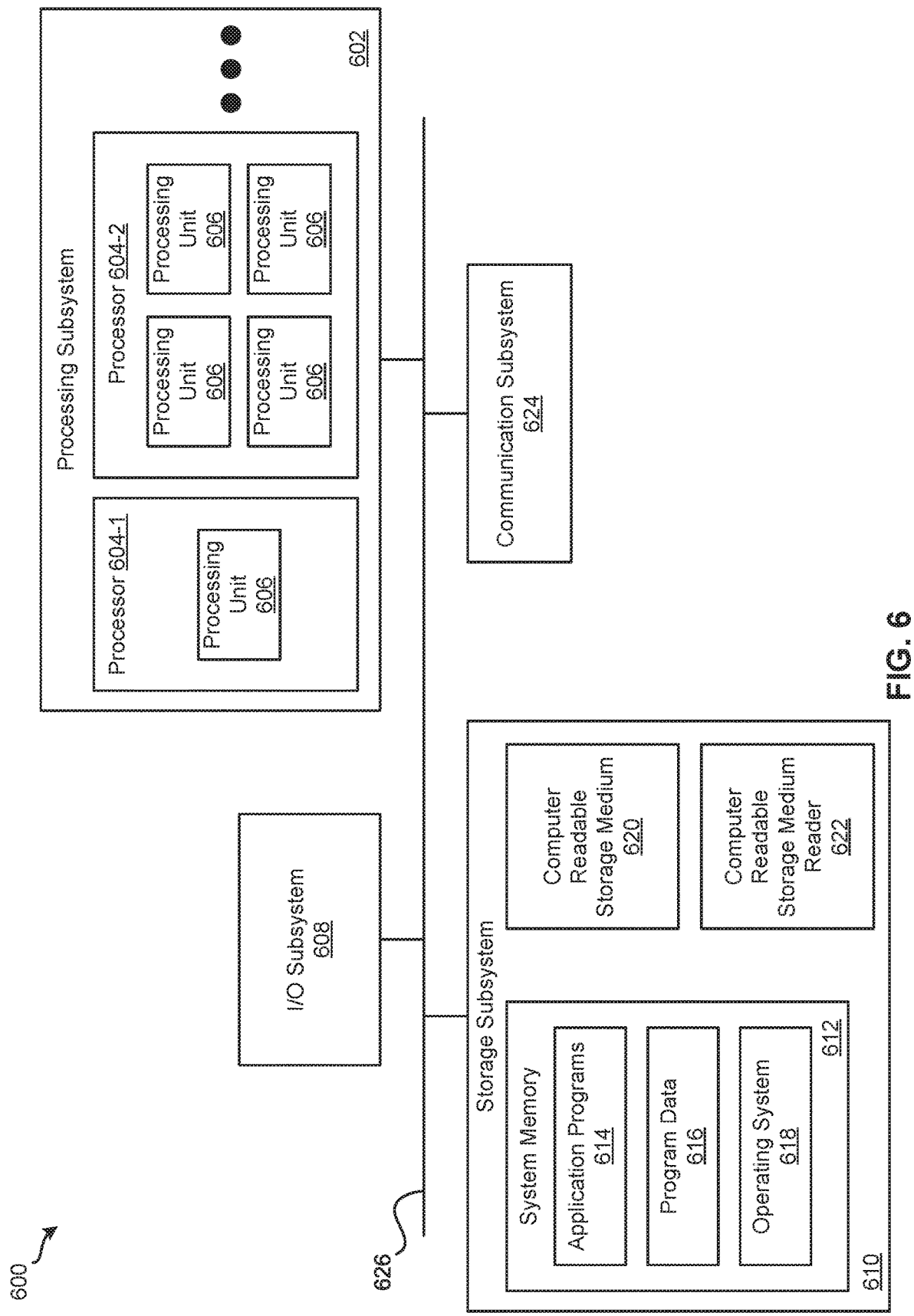
FIG. 6 illustrates an exemplary computer system, in which various embodiments may be implemented.

FIG. 6 illustrates an exemplary computer system 600 for implementing various embodiments described above. For example, computer system 600 may be used to implement nodes 105a-105n. Computer system 600 may be a desktop computer, a laptop, a server computer, or any other type of computer system or combination thereof. Some or all elements of application 110, request and command logs 115, or combinations thereof can be included or implemented in computer system 600. In addition, computer system 600 can implement many of the operations, methods, and/or processes described above (e.g., process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced. ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 500, etc.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem_, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., application 110), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., application 110 and request and command logs 115) and/or processes (e.g., process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RE) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
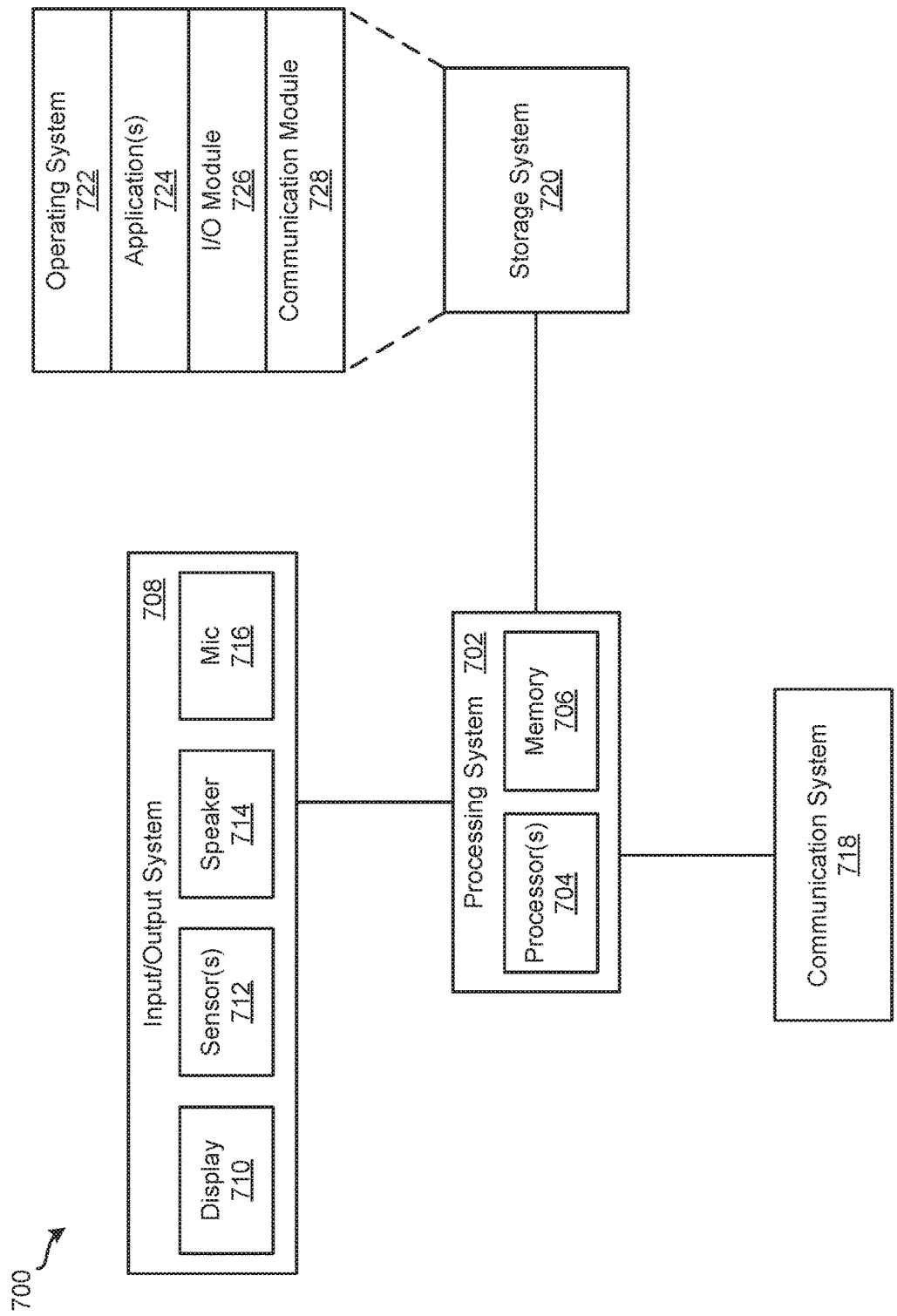
FIG. 7 illustrates an exemplary computing device, in which various embodiments may be implemented.

FIG. 7 illustrates an exemplary computing device 700 for implementing various embodiments described above. For example, computing device 700 may be used to implement nodes 105*a-n*. Computing device 700 may be a cellphone, a smartphone, a wearable device, an activity tracker or manager, a tablet, a personal digital assistant (PDA), a media player, or any other type of mobile computing device or combination thereof. Some or all elements of application 110, request and command logs 115, or combinations thereof can be included or implemented in computing device 700. In addition, computing device 700 can implement many of the operations, methods, and/or processes described above (e.g., process 500). As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RE) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software. Many of the components (e.g., application 110 and request and command logs 115) and/or processes (e.g., process 500) described above may be implemented as software that when executed by a processor or processing unit (e.g., processors 704 of processing system 702) performs the operations of such components and/or processes.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. For example, application 110 may be installed on computing device 700. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components.

The various components shown in FIG. 7 may be implemented in hardware, software, firmware or any combination thereof, including one or more signal processing and/or application specific integrated circuits.

Figure 8:
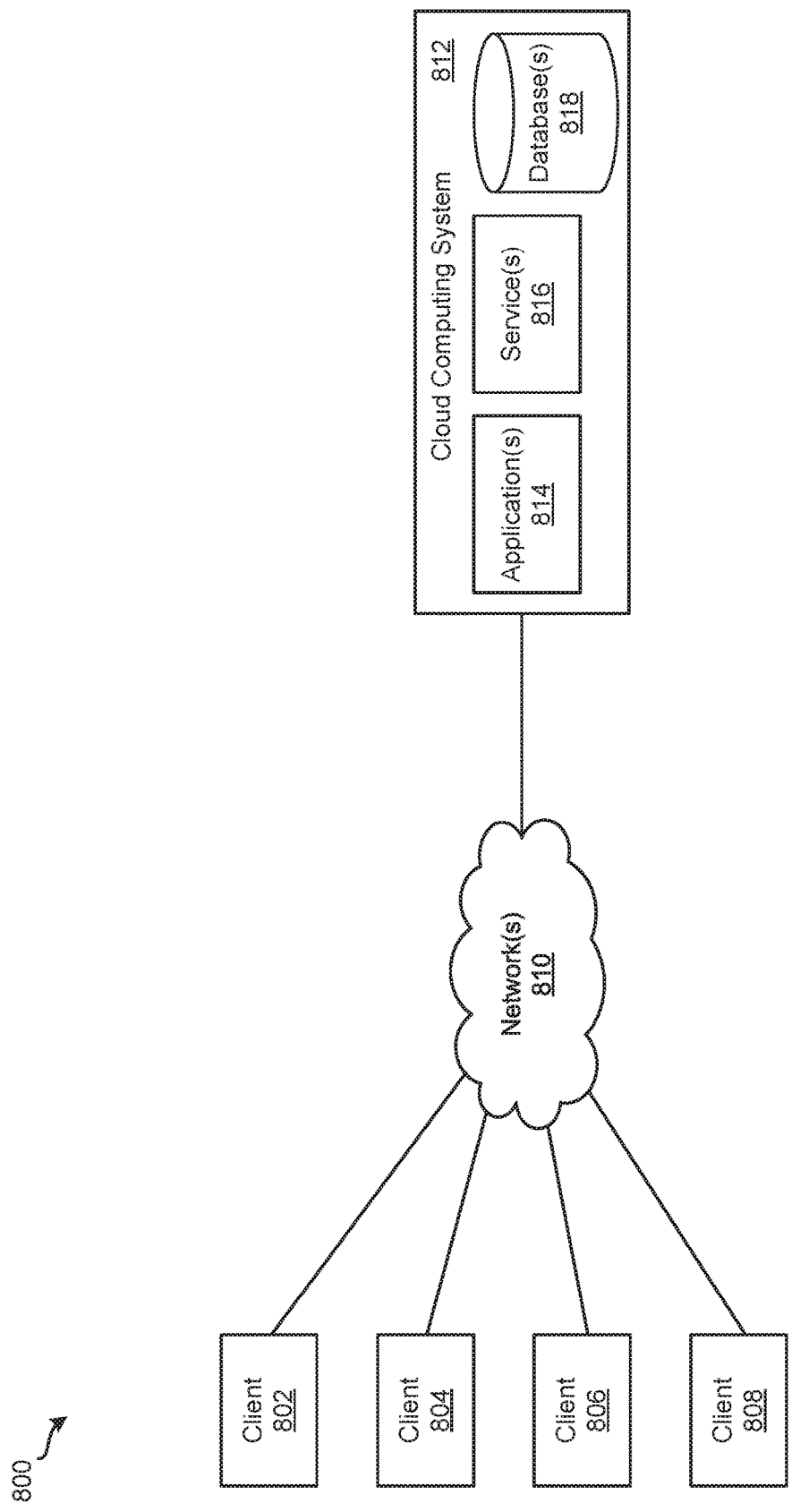
FIG. 8 illustrates an exemplary system, in Lich various embodiments may be implemented.

FIG. 8 illustrates an exemplary system 800 for implementing various embodiments described above. For example, client devices 802-808 of system 800 may be used to implement nodes 105a-105n, databases 818 of cloud computing system 812 may be used to implement storage 305 and storage 405. As shown, system 800 includes client devices 802-808, one or more networks 810, and cloud computing system 812. Cloud computing system 812 is configured to provide resources and data to client devices 802-808 via networks 810. In some embodiments, cloud computing system 812 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 812 may provide applications 814, services 816, and databases 818 to any number of different customers in a self-service, subscription-based, elastically scalable, reliable, highly available, and secure manner.

In some embodiments, cloud computing system 812 may be adapted to automatically provision, manage, and track a customer's subscriptions to services offered by cloud computing system 800. Cloud computing system 812 may provide cloud services via different deployment models. For example, cloud services may be provided under a public cloud model in which cloud computing system 812 is owned by an organization selling cloud services and the cloud services are made available to the general public or different industry enterprises. As another example, cloud services may be provided under a private cloud model in which cloud computing system 812 is operated solely for a single organization and may provide cloud services for one or more entities within the organization. The cloud services may also be provided under a community cloud model in which cloud computing system 812 and the cloud services provided by cloud computing system 812 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 812 is referred to as a "cloud service." Typically, servers and systems that make up cloud computing system 812 are different from the on-premises servers and systems of a customer. For example, cloud computing system 812 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, storages 305 and 405 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a first device in a distributed system, the program comprising sets of instructions for:
    publishing a first request for a collaborative operation to a first log of the first device;
    receiving, at the first log, a second request for the same collaborative operation, the second request requested by a second device in the distributed system;
    publishing a command to a second log of the first device, the command specifying the collaborative operation, the first device and the second device as participants of the collaborative operation, the first device as a leader of the collaborative operation, a first set of operations to be performed by the first device as part of the collaborative operations, and a second set of operations to be performed by the second device as part of the collaborative operation, the leader of the collaborative operation collecting information about the second set of operations from at least the second device; and
    performing the first set of operations as part of the collaborative operation, wherein:
        the first set of operations includes reading a first portion of a file from a shared storage, and
        the second set of operations includes reading a second remaining portion of the file from the shared storage.

2. The non-transitory machine-readable medium of claim 1, wherein the program further comprises sets of instructions for receiving, at the first log, a third request for the same collaborative operation, the third request requested by a third device in the distributed system, wherein the command further specifies the third device as a participant of the collaborative operation and a third set of operations to be performed by the third device as part of the collaborative operations.

3. The non-transitory machine-readable medium of claim 1, wherein the collaborative operation is a collaborative file loading operation.

4. The non-transitory machine-readable medium of claim 1, wherein the first set of operations further includes transmitting the first portion of the file to the second device in the distributed system.

5. The non-transitory machine-readable medium of claim 1, wherein the collaborative operation is a collaborative data recovery operation.

6. The non-transitory machine-readable medium of claim 1, wherein the first log and the second log are synchronized with a respective first log and respective second log of the second device.

7. A method, executable by a first device in a distributed system, comprising:
    publishing a first request for a collaborative operation to a first log of the first device, the first log storing a first entry comprising a first identifier associated with the first request, a second identifier associated with the first device, and a first operation associated with the first request;
    receiving, at the first log, a second request for the same collaborative operation, the second request requested by a second device in the distributed system, the first log storing a second entry comprising a third identifier associated with the second request, a fourth identifier associated with the second device, and the first operation;

responsive to the first entry and the second entry both specifying the first operation, and a first command associated with the collaborative operation not being present in a second log of the first device: publishing a second command to the second log, the second command specifying the collaborative operation, the first device and the second device as participants of the collaborative operation, a first set of operations to be performed by the first device as part of the collaborative operations, and a second set of operations to be performed by the second device as part of the collaborative operation;

synchronizing the second log with a respective second log of the second device;

determining that the first published command is in the second log;

checking for a second published command in the second log that conflicts with the first published command responsive to the determining; and performing the first set of operations as part of the collaborative operation when there is not a second published command in the second log that conflicts with the first published command, wherein:
the first set of operations includes reading a first portion of a file from a shared storage, and
the second set of operations includes reading a second remaining portion of the file from the shared storage.

8. The method of claim 7 further comprising receiving, at the first log, a third request for the same collaborative operation, the third request requested by a third device in the distributed system, wherein the command further specifies the third device as a participant of the collaborative operation and a third set of operations to be performed by the third device as part of the collaborative operations.

9. The method of claim 7, wherein the collaborative operation is a collaborative file loading operation.

10. The method of claim 7, wherein the first set of operations further includes transmitting the first portion of the file to the second device in the distributed system.

11. The method of claim 7, wherein the collaborative operation is a collaborative data recovery operation.

12. The method of claim 7, wherein the first log and the second log are implemented as a single log.

13. The method of claim 7, wherein:
the second published command conflicts with the first published command when the first request is fulfilled by the second published command.

14. The method of claim 13, wherein:
the first published command is determined to be an invalid command when the first published command was published after the second published command;
the second published command is determined to be the invalid command when the second published command was published after the first published command; and
the invalid command is not performed.

15. A first system in a distributed system, the first system comprising:
a set of processing units; and
a non-transitory machine-readable medium storing instructions that when executed by at least one processing unit in the set of processing units cause the at least one processing unit to:

publish a first request for a collaborative operation to a first log of the first system, the first log storing a first entry comprising a first identifier associated with the first request, a second identifier associated with the first system, and a first operation associated with the first request;

receive, at the first log, a second request for the same collaborative operation, the second request requested by a second system in the distributed system, the first log storing a second entry comprising a third identifier associated with the second request, a fourth identifier associated with the second system, and the first operation;

responsive to the first entry and the second entry both specifying the first operation, and a first command associated with the collaborative operation not being present in a second log of the first system: publish a second command to the second log, the second command specifying the collaborative operation, the first system and the second system as participants of the collaborative operation, the first system as a leader of the collaborative operation, a first set of operations to be performed by the first system as part of the collaborative operations, and a second set of operations to be performed by the second system as part of the collaborative operation, the leader of the collaborative operation collecting information about the second set of operations from at least the second system; and perform the first set of operations as part of the collaborative operation, wherein:
the first set of operations includes reading a first portion of a file from a shared storage, and
the second set of operations includes reading a second remaining portion of the file from the shared storage.

16. The first system of claim 15, wherein the instructions further cause the at least one processing unit to receive, at the first log, a third request for the same collaborative operation, the third request requested by a third system in the distributed system, wherein the command further specifies the third system as a participant of the collaborative operation and a third set of operations to be performed by the third system as part of the collaborative operations.

17. The first system of claim 15, wherein the collaborative operation is a collaborative file loading operation.

18. The first system of claim 15, wherein the first set of operations further includes transmitting the first portion of the file to the second system in the distributed system.

19. The first system of claim 15, wherein the collaborative operation is a collaborative data recovery operation.

20. The first system of claim 15 further comprising checking the first log after a predetermined amount of time and wherein the publishing the second command is further responsive to checking the first log.

* * * * *